No. 751,526. PATENTED FEB. 9, 1904.
A. W. MANN.
MIRROR SUPPORT.
APPLICATION FILED OCT. 22, 1903.
NO MODEL.
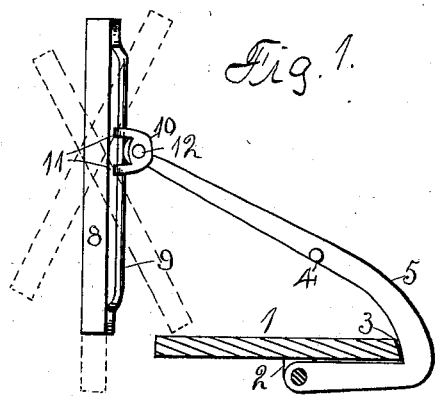
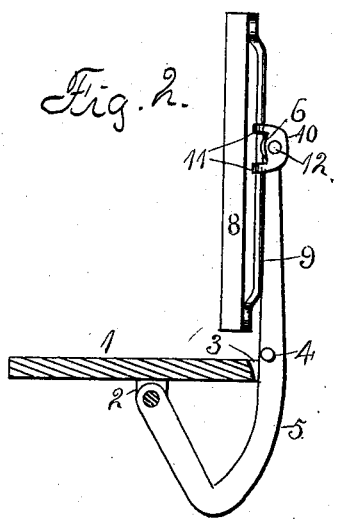
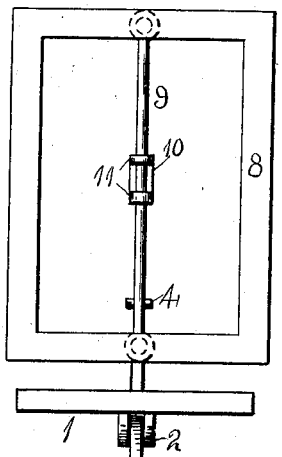
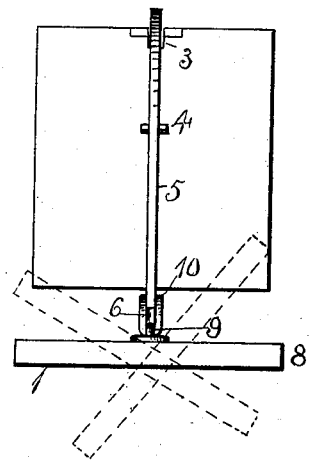
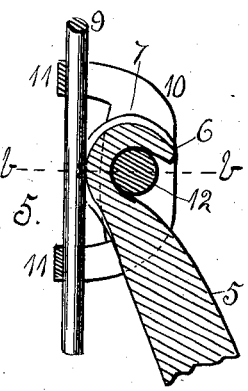
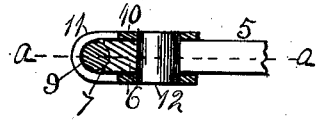
Witnesses:
J. F. Schreiber
E. Behel.
Inventor:
Albert W. Mann.
By A. O. Behel
Atty.

No. 751,526. Patented February 9, 1904.

UNITED STATES PATENT OFFICE.

ALBERT W. MANN, OF ROCKFORD, ILLINOIS, ASSIGNOR TO ROCKFORD FRAME & FIXTURE COMPANY OF ROCKFORD, ILLINOIS, A CORPORATION OF ILLINOIS.

MIRROR-SUPPORT.

SPECIFICATION forming part of Letters Patent No. 751,526, dated February 9, 1904.

Application filed October 22, 1903. Serial No. 178,080. (No model.)

*To all whom it may concern:*

Be it known that I, ALBERT W. MANN, a citizen of the United States, residing at Rockford, in the county of Winnebago and State of Illinois, have invented certain new and useful Improvements in Mirror-Supports, of which the following is a specification.

The object of this invention is to support a mirror in a manner that it can be raised and lowered, turned to the side, and moved to and from the person using it.

In the accompanying drawings, Figures 1 and 2 are elevations of my improvements, the table being in section. Fig. 3 is a face representation. Fig. 4 is a plan view. Fig. 5 is a section on dotted line *a*, Fig. 6. Fig. 6 is a section on dotted line *b*, Fig. 5.

To the underface of the table 1 are secured ears 2, between which is pivoted one end of an arm 5. The rear edge of the table is provided with a notch 3, through which the arm moves, and when the arm is in the position shown at Fig. 2 the studs 4 extending from it will rest against the upper surface of the table. The free end 6 of the arm is in hook form and is provided with a peripheral groove 7.

To the back of the mirror-frame 8 is secured a rod 9. This rod supports a clamp 10, bearing against it at the two points 11 and supporting a stud 12.

In placing the parts together the stud 12 is located in engagement with the hooked free end of the arm 5 and the rod 9 located in the groove 7, which will cause the rod to be clamped at the two points 11 and the intermediate point against the hooked free end of the arm, as shown at Fig. 5. The rod can be adjusted lengthwise in connection with the clamp and hooked end of the arm, as shown in dotted lines, Fig. 1, can be tipped back or brought to the front, as shown in dotted lines, same figure, and can be turned to either side, as shown on dotted lines, Fig. 4.

The arm 5 will stand in any position between the two extremes shown in solid lines, Figs. 1 and 2.

The end of the hook is of cam shape in order that the mirror-frame may be tipped back, thereby relieving the pressure on the rod, which will allow the rod to slide in its connection with the hook.

I claim as my invention—

1. A mirror-support, comprising an arm having a pivotal connection with a stationary support and having a hooked end, a mirror-frame having a rod secured to its back, and a clamp having a pivotal connection with the hook and an adjustable connection along the rod.

2. A mirror-support, comprising an arm having a pivotal connection with a stationary support and having a hooked end provided with a peripheral groove, a mirror-frame having a rod secured to its back, and a clamp having a pivotal connection with the hook and an adjustable connection along the rod.

3. A mirror-support comprising an arm pivoted to the underface of a support and having a portion of its length a segment of a circle and its free end in hook form, a pin extending from the arm and engaging the support, and a mirror-frame having an adjustable and movable connection with the hooked end of the arm.

ALBERT W. MANN.

Witnesses:
A. O. BEHEL,
E. BEHEL.